United States Patent
Fukumine

(10) Patent No.: US 11,414,499 B2
(45) Date of Patent: Aug. 16, 2022

(54) CROSSLINKABLE NITRILE RUBBER COMPOSITION AND CROSSLINKED RUBBER MATERIAL

(71) Applicant: ZEON CORPORATION, Tokyo (JP)

(72) Inventor: Yoshio Fukumine, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 107 days.

(21) Appl. No.: 17/255,262

(22) PCT Filed: Jun. 21, 2019

(86) PCT No.: PCT/JP2019/024802
§ 371 (c)(1),
(2) Date: Dec. 22, 2020

(87) PCT Pub. No.: WO2020/004284
PCT Pub. Date: Jan. 2, 2020

(65) Prior Publication Data
US 2021/0171671 A1 Jun. 10, 2021

(30) Foreign Application Priority Data
Jun. 27, 2018 (JP) .............................. JP2018-121727

(51) Int. Cl.
C08C 19/22 (2006.01)
C08K 3/26 (2006.01)
C08K 3/36 (2006.01)
C08K 9/04 (2006.01)
C08K 3/34 (2006.01)

(52) U.S. Cl.
CPC .............. *C08C 19/22* (2013.01); *C08K 3/26* (2013.01); *C08K 3/346* (2013.01); *C08K 3/36* (2013.01); *C08K 9/04* (2013.01); *C08K 2003/265* (2013.01)

(58) Field of Classification Search
CPC .......... C08C 19/22; C08K 3/26; C08K 3/346; C08K 3/36; C08K 9/04; C08K 2003/265
USPC ........................................................ 524/426
See application file for complete search history.

(56) References Cited

FOREIGN PATENT DOCUMENTS

| JP | 09111048 A | * | 4/1997 |
| JP | 2008-179671 A | | 8/2008 |
| JP | 2008179671 A | * | 8/2008 |

OTHER PUBLICATIONS

Sep. 24, 2019 International Search Report issued in International Patent Application No. PCT/JP2019/024802.

* cited by examiner

*Primary Examiner* — Kelechi C Egwim
(74) *Attorney, Agent, or Firm* — Oliff PLC

(57) ABSTRACT

A cross-linkable nitrile rubber composition that includes a nitrile group-containing copolymer rubber (A), silica (B1), clay (B2), calcium carbonate (B3), and a polyamine-based cross-linking agent (C). A total amount of the silica (B1), the clay (B2), and the calcium carbonate (B3) is 150 to 200 parts by weight with respect to 100 parts by weight of the nitrile group-containing copolymer rubber (A), a content ratio of the silica (B1) is greater than 0 wt % and 50 wt % or less with respect to the total amount of the silica (B1), the clay (B2), and the calcium carbonate (B3), and a content ratio of the clay (B2) and the calcium carbonate (B3) is 30:70 to 90:10 in a weight ratio of "clay (B2):calcium carbonate (B3)".

9 Claims, No Drawings

CROSSLINKABLE NITRILE RUBBER COMPOSITION AND CROSSLINKED RUBBER MATERIAL

TECHNICAL FIELD

The present invention relates to a cross-linkable nitrile rubber composition that has excellent processability and can provide a cross-linked rubber having good normal physical properties and excellent in compression set resistance, resistance to swelling in oil (small change of volume in oil), and resistance to hardening in oil (small change of hardness in oil). The present invention also relates to a cross-linked rubber obtained by using the cross-linkable nitrile rubber composition.

BACKGROUND ART

A saturated nitrile group-containing copolymer rubber represented by hydrogenated acrylonitrile-butadiene copolymer rubber is superior in heat resistance, oil resistance, ozone resistance, and the like compared with a common nitrile group-containing copolymer rubber having a lot of carbon-carbon unsaturated bonds in a main chain structure, such as acrylonitrile-butadiene copolymer rubber, and thus, is suitably used as a rubber component such as seals, hoses, tubes for vehicle use. In contrast, in recent years, in addition to the resistance to swelling in oil, it has been required to be excellent in the resistance to hardening in oil as an oil resistance performance required for rubber components such as seals, hoses, and tubes for vehicle use.

For example, Patent Document 1 discloses a cross-linkable nitrile rubber composition comprising a nitrile rubber (a) having an α,β-ethylenically unsaturated nitrile monomer unit and an α,β-ethylenically unsaturated dicarboxylic acid monoester monomer unit, and having an iodine value of 120 or less, a silicate (b) of an element of group 2 or group 13 in the periodic table, and polyamine-based cross-linking agent (c). Although the cross-linkable nitrile rubber composition disclosed in Patent Document 1 can provide a cross-linked rubber excellent in compression set resistance and resistance to swelling in oil, resistance to hardening in oil is not sufficient, and therefore, there has been a demand for improving the resistance to hardening in oil.

RELATED ART

Patent Documents

Patent Document 1: Japanese Patent Publication No. 2008-179671

SUMMARY OF INVENTION

Problem to be Solved by the Invention

The present invention has been made in consideration of such circumstances. The present invention aims to provide a cross-linkable nitrile rubber composition that has excellent processability and can provide a cross-linked rubber having good normal physical properties and excellent in compression set resistance, resistance to swelling in oil (small change of volume in oil), and resistance to hardening in oil (small change of hardness in oil).

Means for Solving the Problem

As a result of extensive studies to achieve the above object, the present inventor has found that the above object can be achieved by blending silica (B1); clay (B2); and calcium carbonate (B3) in a specific ratio into a cross-linkable nitrile rubber composition comprising a specific nitrile group-containing copolymer rubber containing an α,β-ethylenically unsaturated nitrile monomer unit in a ratio of 8 to 18 wt %; and a polyamine-based cross-linking agent. Thus, the present inventor has completed the present invention.

The present invention provides a cross-linkable nitrile rubber composition comprising: nitrile group-containing copolymer rubber (A) containing an α,β-ethylenically unsaturated nitrile monomer unit, a conjugated diene monomer unit, an α,β-ethylenically unsaturated monocarboxylic acid ester monomer unit, and carboxyl group-containing monomer unit, a content ratio of the α,β-ethylenically unsaturated nitrile monomer unit being 8 to 18 wt %, and having an iodine value of 120 or less; silica (B1); clay (B2); calcium carbonate (B3); and a polyamine-based cross-linking agent (C), wherein a total amount of the silica (B1), the clay (B2), and the calcium carbonate (B3) is 150 to 200 parts by weight with respect to 100 parts by weight of the nitrile group-containing copolymer rubber (A), a content ratio of the silica (B1) is greater than 0 wt % and 50 wt % or less with respect to the total amount of the silica (B1), the clay (B2), and the calcium carbonate (B3), and a content ratio of the clay (B2) and the calcium carbonate (B3) is 30:70 to 90:10 in a weight ratio of "clay (B2):calcium carbonate (B3)".

In the cross-linkable nitrile rubber composition according to the present invention, it is preferable that the clay (B2) comprises a compound represented by the following general formula (1) as a main component.

$$(M^I_2O)_a(M^{II}O)_b(M^{III}_2O_3)_c(M^{IV}_2O_3)_d \cdot xSiO_2 \cdot mH_2O \quad (1)$$

In the above general formula (1), $M^I$ is an alkaline metal, $M^{II}$ is an alkaline earth metal, $M^{III}$ is an element in group 4 of the periodic table, $M^{IV}$ is an element in group 13 of the periodic table, $a+b+c+d=1$, $x$ is a positive real number of 8 or less, and $m$ is 0 or a positive real number of 12 or less.

In the cross-linkable nitrile rubber composition according to the present invention, it is preferable that the clay (B2) is surface-treated clay that is surface treated with a surface treating agent.

In the cross-linkable nitrile rubber composition according to the present invention, it is preferable to further comprise a plasticizer (D), and that a content of the plasticizer (D) is 21 to 50 parts by weight with respect to 100 parts by weight of the nitrile group-containing copolymer rubber (A).

In the cross-linkable nitrile rubber composition according to the present invention, it is preferable that a content of the silica (B1) is 10 to 60 parts by weight with respect to 100 parts by weight of the nitrile group-containing copolymer rubber (A).

In the cross-linkable nitrile rubber composition according to the present invention, it is preferable that a content of the clay (B2) is 30 to 130 parts by weight with respect to 100 parts by weight of the nitrile group-containing copolymer rubber (A).

In the cross-linkable nitrile rubber composition according to the present invention, it is preferable that a content of the calcium carbonate (B3) is 10 to 70 parts by weight with respect to 100 parts by weight of the nitrile group-containing copolymer rubber (A).

In the cross-linkable nitrile rubber composition according to the present invention, it is preferable that the silica (B1) is a coupling agent-treated silica that is surface treated with a coupling agent.

Further, the present invention provides a cross-linked rubber obtained by cross-linking the cross-linkable nitrile rubber composition according to the present invention above.

EFFECTS OF INVENTION

The present invention can provide a cross-linkable nitrile rubber composition that has excellent processability and can provide a cross-linked rubber having good normal physical properties and excellent in compression set resistance, resistance to swelling in oil (small volume change in oil), and resistance to hardening in oil (small hardness change in oil). Further, the present invention can provide a cross-linked rubber obtained by using such a cross-linkable nitrile rubber composition, and is good in normal physical properties, and excellent in compression set resistance, resistance to swelling in oil, and resistance to hardening in oil.

DESCRIPTION OF EMBODIMENTS

A cross-linkable nitrile rubber composition of the present invention comprises:
nitrile group-containing copolymer rubber (A) containing an α,β-ethylenically unsaturated nitrile monomer unit, a conjugated diene monomer unit, an α,β-ethylenically unsaturated monocarboxylic acid ester monomer unit, and carboxyl group-containing monomer unit, a content ratio of the α,β-ethylenically unsaturated nitrile monomer unit being 8 to 18 wt %, and having an iodine value of 120 or less;
silica (B1);
clay (B2);
calcium carbonate (B3); and
a polyamine-based cross-linking agent (C),
wherein a total amount of the silica (B1), the clay (B2), and the calcium carbonate (B3) is 150 to 200 parts by weight with respect to 100 parts by weight of the nitrile group-containing copolymer rubber (A),
a content ratio of the silica (B1) is greater than 0 wt % and 50 wt % or less with respect to the total amount of the silica (B1), the clay (B2), and the calcium carbonate (B3), and
a content ratio of the clay (B2) and the calcium carbonate (B3) is 30:70 to 90:10 in a weight ratio of "clay (B2): calcium carbonate (B3)".

<Nitrile Group-Containing Copolymer Rubber (A)>

The nitrile group-containing copolymer rubber (A) used in the present invention contains an α,β-ethylenically unsaturated nitrile monomer unit, a conjugated diene monomer unit, an α,β-ethylenically unsaturated monocarboxylic acid ester monomer unit, and a carboxyl group-containing monomer unit, and the content ratio of the α,β-ethylenically unsaturated nitrile monomer unit is 8 to 18 wt %, and an iodine value of the copolymer rubber (A) is in the range of 120 or less.

The nitrile group-containing copolymer rubber (A) used in the present invention is obtained by copolymerizing an α,β-ethylenically unsaturated nitrile monomer, a conjugated diene monomer, an α,β-ethylenically unsaturated monocarboxylic acid ester monomer, a carboxyl group-containing monomer, and, if necessary, other copolymerizable monomers.

The α,β-ethylenically unsaturated nitrile monomer is not limited so long as it is an α,β-ethylenically unsaturated compound having a nitrile group. Examples thereof include acrylonitrile; α-halogenoacrylonitriles such as α-chloroacrylonitrile, α-bromoacrylonitrile; α-alkylacrylonitriles such as methacrylonitrile, ethanacrylonitrile; and the like. Among these, acrylonitrile and methacrylonitrile are preferable, and acrylonitrile is particularly preferable. As the α,β-ethylenically unsaturated nitrile monomer, a plurality of these may be used in combination.

In the nitrile group-containing copolymer rubber (A) used in the present invention, the content of the α,β-ethylenically unsaturated nitrile monomer unit is from 8 to 18 wt %, preferably from 10 to 18 wt %, more preferably from 12 to 17 wt %, with respect to the total monomer units. When the content of the α,β-ethylenically unsaturated nitrile monomer unit is too small, the obtained cross-linked rubber is liable to be inferior in the oil resistance. By contrast, when the content of the α,β-ethylenically unsaturated nitrile monomer unit is too large, there is a possibility that the resistance to hardening in oil decreases.

As the conjugated diene monomer, conjugated diene monomers having 4 to 6 carbon atoms such as 1,3-butadiene, isoprene, 2,3-dimethyl-1,3-butadiene, 1,3-pentadiene, and chloroprene are preferable, 1,3-butadiene and isoprene are more preferable, and 1,3-butadiuene is particularly preferable. The conjugated diene monomers may be used as single types alone or as a plurality of types in combination.

In the nitrile group-containing copolymer rubber (A) used in the present invention, the content of the conjugated diene monomer unit (including hydrogenated moieties) is preferably from 20 to 60 wt %, more preferably from 25 to 55 wt %, and still more preferably from 30 to 50 wt %, with respect to the total monomer units. By setting the content of the conjugated diene monomer unit within the above-mentioned range, a cross-linked rubber excellent in rubber elasticity can be obtained while keeping heat resistance and chemical stability good.

The α,β-ethylenically unsaturated monocarboxylic acid ester monomer is not particularly limited. Examples thereof include α,β-ethylenically unsaturated monocarboxylic acid alkyl ester monomers, α,β-ethylenically unsaturated monocarboxylic acid alkoxyalkyl ester monomers, α,β-ethylenically unsaturated monocarboxylic acid aminoalkyl ester monomers, α,β-ethylenically unsaturated monocarboxylic acid hydroxyalkyl ester monomers, and α,β-ethylenically unsaturated monocarboxylic acid fluoroalkyl ester monomers and the like.

Among these, α,β-ethylenically unsaturated monocarboxylic acid alkyl ester monomers and α,β-ethylenically unsaturated monocarboxylic acid alkoxyalkyl ester monomers are preferred, and α,β-ethylenically unsaturated monocarboxylic acid alkyl ester monomers are more preferred.

By containing an α,β-ethylenically unsaturated monocarboxylic acid ester monomer unit, cold resistance of the obtained cross-linked rubber can be improved, thereby enabling improvement in sealability at low temperatures.

The α,β-ethylenically unsaturated monocarboxylic acid alkyl ester monomer preferably has an alkyl group having 3 to 10 carbon atoms, more preferably has an alkyl group having 3 to 8 carbon atoms, and still more preferably has an alkyl group having 4 to 6 carbon atoms, as the alkyl group.

Specific examples of the α,β-ethylenically unsaturated monocarboxylic acid alkyl ester monomer include acrylic acid alkyl ester monomers such as methyl acrylate, ethyl acrylate, propyl acrylate, isobutyl acrylate, n-butyl acrylate, n-pentyl acrylate, 2-ethylhexyl acrylate, and n-dodecyl acrylate; acrylic acid cycloalkyl ester monomers such as cyclopentyl acrylate and cyclohexyl acrylate; acrylic acid alkylcycloalkyl ester monomers such as ethylcyclopentyl acrylate, and methylcyclohexyl acrylate; methacrylic acid alkyl ester monomers such as methyl methacrylate, ethyl methacrylate, propyl methacrylate, n-butyl methacrylate, n-pentyl methacrylate, and n-octyl methacrylate; methacrylic acid cycloalkyl ester monomers such as cyclopentyl methacrylate, cyclohexyl methacrylate, and cyclopentyl methacrylate; methacrylic acid alkylcycloalkyl ester monomers such as methylcyclopentyl methacrylate, ethylcyclopentyl methacrylate, and methylcyclohexyl methacrylate; crotonic acid alkyl ester monomers such as propyl crotonate, n-butyl crotonate, and 2-ethylhexyl crotonate; crotonic acid cycloalkyl ester monomers such as cyclopentyl crotonate, cyclohexyl crotonate, and cyclooctyl crotonate; crotonic acid alkylcycloalkyl ester monomers such as methylcyclopentyl crotonate, methylcyclohexyl crotonate; and the like.

Further, the α,β-ethylenically unsaturated monocarboxylic acid alkoxyalkyl ester monomer preferably has an alkoxyalkyl group having 2 to 8 carbon atoms, more preferably has an alkoxyalkyl group having 2 to 6 carbon atoms, and still more preferably has an alkoxyalkyl group having 2 to 4 carbon atoms, as the alkoxy alkyl group.

Specific examples of the α,β-ethylenically unsaturated monocarboxylic acid alkoxyalkyl ester monomer include acrylic acid alkoxyalkyl ester monomers such as methoxymethyl acrylate, methoxyethyl acrylate, methoxybutyl acrylate, ethoxymethyl acrylate, ethoxyethyl acrylate, ethoxypropyl acrylate, ethoxydodecyl acrylate, n-propoxyethyl acrylate, i-propoxyethyl acrylate, n-butoxyethyl acrylate, i-butoxyethyl acrylate, t-butoxyethyl acrylate, methoxypropyl acrylate, and methoxybutyl acrylate; methacrylic acid alkoxyalkyl ester monomers such as methoxymethyl methacrylate, methoxyethyl methacrylate, methoxybutyl methacrylate, ethoxymethyl methacrylate, ethoxyethyl methacrylate, ethoxypentyl methacrylate, n-propoxyethyl methacrylate, i-propoxyethyl methacrylate, n-butoxyethyl methacrylate, i-butoxyethyl methacrylate, t-butoxyethyl methacrylate, methoxypropyl methacrylate, and methoxybutyl methacrylate; and the like.

Among these α,β-ethylenically unsaturated monocarboxylic acid ester monomers, from the viewpoint of being capable of making the effects of the present invention further remarkable, the acrylic acid alkyl ester monomer and the acrylic acid alkoxyalkyl ester monomer are preferable, n-butyl acrylate and methoxyethyl acrylate are more preferable, and n-butyl acrylate is particularly preferable. Further, these α,β-ethylenically unsaturated monocarboxylic acid ester monomers can also be used as two or more types in combination.

In the nitrile group-containing copolymer rubber (A) used in the present invention, the content of the α,β-ethylenically unsaturated monocarboxylic acid ester monomer unit is preferably 10 to 60 wt %, more preferably 15 to 55 wt %, and still more preferably 20 to 50 wt %. By setting the content of the α,β-ethylenically unsaturated monocarboxylic acid ester monomer unit within the above-mentioned range, it is possible to more suitably increase the cold resistance of the obtained cross-linked rubber.

The carboxyl group-containing monomer is not particularly limited so long as it is a monomer copolymerizable with an α,β-ethylenically unsaturated nitrile monomer, a conjugated diene monomer, and an α,β-ethylenically unsaturated monocarboxylic acid ester monomer and having one or more unsubstituted (free) carboxyl groups that are not esterified or the like. By using the carboxyl group-containing monomer, a carboxyl group can be introduced into the nitrile group-containing copolymer rubber (A).

Examples of the carboxyl group-containing monomers include α,β-ethylenically unsaturated monocarboxylic acid monomers, α,β-ethylenically unsaturated polyvalent carboxylic acid monomers, α,β-ethylenically unsaturated dicarboxylic acid monoester monomers, and the like. The carboxyl group-containing monomers also include those having carboxyl groups that form carboxylates. In addition, anhydrides of the α,β-ethylenically unsaturated polyvalent carboxylic acids can be used as the carboxyl group-containing monomers since their acid anhydride groups are cleaved to form carboxyl groups after copolymerization.

Examples of the α,β-ethylenically unsaturated monocarboxylic acid monomers include acrylic acid, methacrylic acid, ethylacrylic acid, crotonic acid, cinnamic acid, and the like.

Examples of the α,β-ethylenically unsaturated polyvalent carboxylic acid monomers include butenedioic acids such as fumaric acid and maleic acid, itaconic acid, citraconic acid, mesaconic acid, glutaconic acid, allylmalonic acid, teraconic acid, and the like. Examples of the anhydrides of the α,β-ethylenically unsaturated polyvalent carboxylic acids include maleic anhydride, itaconic anhydride, citraconic anhydride, and the like.

Examples of the α,β-ethylenically unsaturated dicarboxylic acid monoester monomers include maleic acid monoalkyl esters such as monomethyl maleate, monoethyl maleate, monopropyl maleate, and mono-n-butyl maleate; maleic acid monocycloalkyl esters such as monocyclopentyl maleate, monocyclohexyl maleate, and monocycloheptyl maleate; maleic acid monoalkyl cycloalkyl esters such as monomethyl cyclopentyl maleate and monoethyl cyclohexyl maleate; fumaric acid monoalkyl esters such as monomethyl fumarate, monoethyl fumarate, monopropyl fumarate, and mono-n-butyl fumarate; fumaric acid monocycloalkyl esters such as monocyclopentyl fumarate, monocyclohexyl fumarate, and monocycloheptyl fumarate; fumaric acid monoalkyl cycloalkyl esters such as monomethyl cyclopentyl fumarate and monoethyl cyclohexyl fumarate; citraconic acid monoalkyl esters such as monomethyl citraconate, monoethyl citraconate, monopropyl citraconate, and mono-n-butyl citraconate; citraconic acid monocycloalkyl esters such as monocyclopentyl citraconate, monocyclohexyl citraconate, and monocycloheptyl citraconate; citraconic acid monoalkyl cycloalkyl esters such as monomethyl cyclopentyl citraconate and monoethyl cyclohexyl citraconate; itaconic acid monoalkyl esters such as monomethyl itaconate, monoethyl itaconate, monopropyl itaconate, and mono-n-butyl itaconate; itaconic acid monocycloalkyl esters such as monocyclopentyl itaconate, monocyclohexyl itaconate, and monocycloheptyl itaconate; itaconic acid monoalkyl cycloalkyl esters such as monomethyl cyclopentyl itaconate, and monoethyl cyclohexyl itaconate; and the like.

The carboxyl group-containing monomers may be used as single types alone or as a plurality of types in combination. Among these, from the viewpoint of making the effects of the present invention further remarkable, the α,β-ethylenically unsaturated dicarboxylic acid monoester monomers are preferable, the α,β-ethylenically unsaturated dicarboxylic acid monoalkyl ester monomers are more preferable, maleic acid monoalkyl ester is further preferable, and mono-n-butyl maleate is particularly preferable. Note that the above-mentioned alkyl esters preferably have 2 to 8 carbon atoms.

The content of the carboxyl group-containing monomer unit is preferably 0.1 to 20 wt %, more preferably 0.5 to 15 wt %, and still more preferably 1 to 10 wt %, with respect to the total monomer units. By setting the content of the carboxyl group-containing monomer unit within the above-mentioned range, it is possible to make the mechanical properties and the compression set resistance of the obtained cross-linked rubber better.

Further, in addition to an α,β-ethylenically unsaturated nitrile monomer unit, a conjugated diene monomer unit, an α,β-ethylenically unsaturated monocarboxylic acid ester monomer unit, and a carboxyl group-containing monomer unit, the nitrile group-containing copolymer rubber (A) used in the present invention may contain units of other monomers copolymerizable with monomers forming the four units above. Such other monomers include an α,β-ethylenically unsaturated monocarboxylic acid ester monomer other than those mentioned above, ethylene, an α-olefin monomer, an aromatic vinyl monomer, a fluorine-containing vinyl monomer, a copolymerizable antioxidant, and the like.

The α,β-ethylenically unsaturated monocarboxylic acid ester monomer other than those mentioned above includes (meth)acrylic acid esters each having a cyanoalkyl group having 2 to 12 carbon atoms such as α-cyanoethyl acrylate, α-cyanoethyl methacrylate, and cyanobutyl methacrylate; (meth)acrylic acid esters each having a hydroxyalkyl group having 1 to 12 carbon atoms such as 2-hydroxyethyl acrylate, 2-hydroxypropyl acrylate, and 2-hydroxyethyl methacrylate; (meth)acrylic acid esters each having a fluoroalkyl group having 1 to 12 carbon atoms such as trifluoroethyl acrylate and tetrafluoropropyl methacrylate; and the like.

The olefin monomer preferably has 3 to 12 carbon atoms, and includes, for example, propylene, 1-butene, 4-methyl-1-pentene, 1-hexane, 1-octane, and the like.

The aromatic vinyl monomer includes styrene, α-methylstyrene, vinylpyridine, and the like.

The fluorine-containing vinyl monomer includes fluoroethyl vinyl ether, fluoropropyl vinyl ether, o-trifluoromethylstyrene, vinyl pentafluorobenzoate, difluoroethylene, tetrafluoroethylene, and the like.

The copolymerizable antiaging agent include N-(4-anilinophenyl)acrylamide, N-(4-anilinophenyl)methacrylamide, N-(4-anilinophenyl)cinnamamide, N-(4-anilinophenyl) crotonamide, N-phenyl-4-(3-vinylbenzyloxy)aniline, N-phenyl-4-(4-vinylbenzyloxy)aniline, and the like.

These copolymerizable other monomers may be used as a plurality of types in combination. The content of the other monomer unit(s) is preferably 50 wt % or less, more preferably 40 wt % or less, and still more preferably 10 wt % or less, with respect to all the monomer units constituting the nitrile group-containing copolymer rubber (A).

The iodine value of the nitrile group-containing copolymer rubber (A) used in the present invention is 120 or less, preferably 80 or less, more preferably 50 or less, and particularly preferably 30 or less. When the iodine value of the nitrile group-containing copolymer rubber (A) is too high, heat resistance and ozone resistance of the obtained cross-linked rubber may decrease.

The polymer Mooney viscosity (ML1+4, 100° C.) of the nitrile group-containing copolymer rubber (A) used in the present invention is preferably from 10 to 200, more preferably from 15 to 150, still more preferably from 15 to 100, and particularly preferably from 30 to 70. By setting the polymer Mooney viscosity of the nitrile group-containing copolymer rubber (A) within the above range, it is possible to further enhance mechanical properties of the obtained cross-linked rubber while keeping processability of the cross-linkable nitrile rubber composition good.

The method for producing the nitrile group-containing copolymer rubber (A) used in the present invention is not particularly limited, but it is possible to produce it by copolymerizing the above-mentioned monomers and, if necessary, hydrogenating the carbon-carbon double bonds in the obtained copolymer. The polymerization method is not particularly limited, and a known emulsion polymerization method or solution polymerization method may be used, but the emulsion polymerization method is preferable from the viewpoint of the industrial productivity. At the time of the emulsion polymerization, in addition to the emulsifier, a polymerization initiator, and a molecular weight adjuster, polymerization auxiliary materials usually used can be used.

The emulsifier is not particularly limited, but includes, for example, nonionic emulsifiers such as polyoxyethylene alkyl ethers, polyoxyethylene alkyl phenol ethers, polyoxyethylene alkyl esters, and polyoxyethylene sorbitan alkyl esters; anionic emulsifiers such as salts of fatty acids such as myristic acid, palmitic acid, oleic acid, and linoleic acid, alkylbenzene sulfonic acid salts such as sodium dodecylbenzenesulfonate, higher alcohol sulfuric acid ester salts, and alkyl sulfosuccinic acid salts; and copolymerizable emulsifiers such as sulfo esters of α,β-unsaturated carboxylic acids, sulfate esters of α,β-unsaturated carboxylic acids, sulfoalkylaryl ethers, and the like. The amount of addition of the emulsifier is preferably 0.1 to 10 parts by weight and more preferably 0.5 to 5 parts by weight with respect to 100 parts by weight of the monomer used for the polymerization.

The polymerization initiator is not particularly limited so long as the polymerization initiator is a radical initiator. The polymerization initiator includes inorganic peroxides such as potassium persulfate, sodium persulfate, ammonium persulfate, potassium perphosphate, and hydrogen peroxide; organic peroxides such as t-butyl peroxide, cumene hydroperoxide, p-menthane hydroperoxide, t-butylcumyl peroxide, acetyl peroxide, isobutyryl peroxide, octanoyl peroxide, dibenzoyl peroxide, 3,5,5-trimethylhexanoyl peroxide, and t-butylperoxyisobutyrate; azo compounds such as azobisisobutyronitrile, azobis-2,4-dimethylvaleronitrile, azobiscyclohexanecarbonitrile, and methyl azobisisobutyrate; and the like. These polymerization initiators can be used alone or as two or more types in combination. As the polymerization initiator, an inorganic or organic peroxide is preferable. When a peroxide is used as a polymerization initiator, the peroxide can be used in combination with a reducing agent as a redox-type polymerization initiator. The reducing agent is not particularly limited, and examples thereof include compounds which are in a reduced state and contains metal ions such as ferrous sulfate and cuprous naphthenate; sulfinates such as sodium hydroxymethanesulfinate; and sulfites such as sodium sulfite, potassium sulfite, sodium hydrogen sulfite, aldehyde sodium hydrogen sulfite, potassium sulfite; and the like. The amount of addition of the polymerization initiator is preferably 0.01 to 2 parts by weight with respect to 100 parts by weight of the monomers used for the polymerization.

For the medium of emulsion polymerization, usually water is used. The amount of water is preferably 80 to 500 parts by weight, and more preferably 80 to 300 parts by weight with respect to 100 parts by weight of the monomers used for the polymerization.

In the emulsion polymerization, it is possible to further use, if necessary, polymerization auxiliary materials such as a stabilizer, a dispersant, a pH adjuster, a deoxidizer, and a particle size adjuster. When these are used, the types and the amounts used thereof are not particularly limited.

Further, in the present invention, for the obtained copolymer, if necessary, the copolymer may be hydrogenated (hydrogenation reaction). The hydrogenation may be performed on the basis of a known method. The known method includes an oil layer hydrogenation method in which the latex of the copolymer obtained by emulsion polymerization is coagulated, and then the hydrogenation is performed in the oil layer; an aqueous layer hydrogenation method in which the latex of the obtained copolymer is hydrogenated as it is; and the like.

When the hydrogenation is performed by the oil layer hydrogenation method, preferably the latex of the copolymer prepared by the emulsion polymerization is coagulated by salting out or by using an alcohol, and the coagulated product is filtered out and dried, and then, dissolved in an organic solvent. Next, a hydrogenation reaction (the oil layer hydrogenation method) is performed, the obtained hydride is poured into a large amount of water to be coagulated, the coagulated product is filtered out and dried, and thus the nitrile group-containing copolymer rubber (A) can be obtained.

For the coagulation of the latex by salting out, a known coagulant such as sodium chloride, calcium chloride, or aluminum sulfate can be used. Further, instead of the coagulation by salting out, the coagulation may also be performed by using an alcohol such as methanol. The solvent for the oil layer hydrogenation method is not particularly limited so long as the solvent is a liquid organic compound dissolving the copolymer obtained by emulsion polymerization; however, as such a solvent, preferably used are benzene, chlorobenzene, toluene, xylene, hexane, cyclohexane, tetrahydrofuran, methyl ethyl ketone, ethyl acetate, cyclohexanone and acetone.

As the catalyst of the oil layer hydrogenation method, any known selective hydrogenation catalyst can be used without particular limitation; a palladium-based catalyst and a rhodium-based catalyst are preferable, and a palladium-based catalyst (such as palladium acetate, palladium chloride and palladium hydroxide) are more preferable. These may be used as two or more types in combination; however, in such a case, it is preferable to use a palladium-based catalyst as the main active component. These catalysts are usually used as carried on carriers. The carrier includes silica, silica-alumina, alumina, diatomaceous earth, activated carbon, and the like. The amount of use of the catalyst is preferably 10 to 5000 ppm by weight and more preferably 100 to 3000 ppm by weight with respect to the copolymer.

Alternatively, when the hydrogenation is performed by the aqueous layer hydrogenation method, the hydrogenation reaction is pertained by adding water to and diluting, if necessary, the latex of the copolymer prepared by the emulsion polymerization. The aqueous layer hydrogenation method includes an aqueous layer direct hydrogenation method in which the latex is hydrogenated by supplying hydrogen to the reaction system in the presence of a hydrogenation catalyst, and an indirect aqueous layer hydrogenation method in which the latex is hydrogenated by reducing the latex in the presence of an oxidizing agent, a reducing agent and an activating agent. Of these two methods, the aqueous layer direct hydrogenation method is preferable.

In the aqueous layer direct hydrogenation method, the concentration of the copolymer in the aqueous layer (concentration in latex state) is preferably 40 wt % or less, in order to prevent the aggregation. The hydrogenation catalyst is not particularly limited so long as the catalyst is a compound being hardly decomposed by water. Specific examples thereof include palladium salts of carboxylic acids such as formic acid, propionic acid, lauric acid, succinic acid, oleic acid, and phthalic acid; palladium chlorides such as palladium chloride, dichloro(cyclooctadiene)palladium, dichloro(norbornadiene)palladium, and ammonium hexachloropalladate (IV); iodides such as palladium iodide; palladium sulfate-dihydrate, and the like. Among these, the palladium salts of carboxylic acids, dichloro(norbornadiene) palladium, and ammonium hexachloropalladate (IV) are particularly preferable. The amount of use of the hydrogenation catalyst may be appropriately set; however, the amount of use of the hydrogenation catalyst is preferably 5 to 6000 ppm by weight and more preferably 10 to 4000 ppm by weight with respect to the copolymer obtained by polymerization.

In the aqueous layer direct hydrogenation method, after the completion of the hydrogenation reaction, the hydrogenation catalyst in the latex is removed. As the method for removing the hydrogenation catalyst, for example, it is possible to adopt a method in which an adsorbent such as activated carbon or an ion-exchange resin is added to the latex, the hydrogenation catalyst is adsorbed to the adsorbent under stirring, and then the latex is subjected to a filtration or centrifugation. It is also possible not to remove the hydrogenation catalyst so as remain in the latex.

Then, in the aqueous layer direct hydrogenation method, nitrile group-containing copolymer rubber (A) can be obtained by performing coagulation with salting out, filtration and drying, and the like on the latex after the hydrogenation reaction thus obtained. In this case, the steps of filtration and drying following coagulation may be performed by known methods.

<Silica (B1), Clay (B2), Calcium Carbonate (B3)>

The cross-linkable nitrile rubber composition of the present invention comprises silica (B1), clay (B2), and calcium carbonate (B3) as fillers.

The silica (B1) used in the present invention is not particularly limited. Examples thereof include natural silica such as quartz powder and silica powder; synthetic silica such as silicic anhydride (silica gel, aerogel, and the like), and hydrous silicic acid and the like. And among these, synthetic silica is preferred. Further, these silicas may be those surface-treated with a coupling agent such as a silane coupling agent, an aluminum-based coupling agent, a titanate-based coupling agent, and the like. By surface-treating with a coupling agent, dispersibility of silica (B1) in the cross-linkable nitrile rubber composition can be further increased, thereby further enhancing the effect of blending silica (B1).

The silane coupling agent is not particularly limited. Examples thereof include sulfur-containing silane coupling agents, such as γ-mercaptopropyltrimethoxysilane, mercaptomethyltrimethoxysilane, mercaptomethyltriethoxysilane, bis(3-triethoxysilylpropyl)tetrasulfane, bis(3-triethoxysilylpropyl)disulfane; epoxy group-containing silane coupling agents, such as γ-glycidoxypropyltrimethoxysilane, γ-glycidoxypropylmethyldimethoxysilane, β-(3,4-epoxycyclohexyl)ethyltrimethoxysilane, γ-mercaptopropyltrimethoxysilane, γ-glycidoxypropylmethyldiethoxysilane; amino group-containing silane coupling agents, such as N-(β-aminoethyl)-γ-aminopropyltrimethoxysilane, γ-aminopropyltrimethoxysilane, γ-aminopropyltriethoxysilane, N-2-(aminoethyl)-3-aminopropyltrimethoxysilane, N-2-(aminoethyl)-3-aminopropyltriethoxysilane, 3-triethoxysilyl-N-(1,3-dimethyl-butylidene)propylamine, N-phenyl-3-aminopropyltrimethoxysilane; (meth)acryloxy group-containing silane coupling agents, such as γ-methacryloxypropyltrimethoxysilane, γ-methacryloxyloxypropyltris(β-methoxyethoxy)silane, γ-methacryloxypropylmethyldimethoxysilane, γ-methacryloxypropylmethyldiethoxysilane, γ-methacryloxypropyltriethoxysilane, γ-acryloxypropyltrimethoxysilane; vinyl group-containing silane coupling agents, such as vinyltrimethoxysilane, vinyltriethoxysilane, vinyltris(β-methoxyethoxy)silane, vinyltrichlorosilane, vinyltriacetoxysilane; chloropropyl group-containing silane coupling agents, such as 3-chloropropyltrimethoxysilane; isocyanate group-containing silane coupling agents, such as 3-isocyanate propyltriethoxysilane; styryl group-containing silane coupling agents, such as p-styryltrimethoxysilane; ureido group-containing silane coupling agents, such as 3-ureidopropyltriethoxysilane; allyl group-containing silane coupling agents, such as diallyldimethylsilane; alkoxy group-containing silane coupling agents, such as tetraethoxysilane; phenyl group-containing silane coupling agents, such as diphenyldimethoxysilane; fluoro group-containing silane coupling agents, such as trifluoropropyltrimethoxysilane; alkyl group-containing silane coupling agents, such as isobutyltrimethoxysilane, cyclohexylmethyldimethoxysilane; and the like.

Examples of the aluminum-based coupling agents include acetoalkoxyaluminum diisopropylate, aluminum diisopropoxymonoethylacetoacetate, aluminum trisethylacetoacetate, aluminum trisacetylacetonate, and the like.

Examples of the titanate-based coupling agents include isopropyltriisostearoiltitanate, isopropyltris(dioctylpyrophosphate)titanate, isopropyltri(N-aminoethyl-aminoethyl) titanate, tetraoctylbis(ditridecylphosphite)titanate, tetra(2,2-diallyloxymethyl-1-butyl)bis(ditridecyl)phosphitetitanate, bis(dioctylpyrophosphate)oxyacetatetitanate, bis(dioctylpyrophosphate)ethylenetitanate, tetraisopropylbis(dioctylphosphite)titanate, isopropyltriisostearoiltitanate, and the like. These may be used as single types or a plurality of types in combination.

A specific surface area of the silica (B1) used in the present invention measured by the BET method is not particularly limited, but is preferably 10 to 600 m²/g, more preferably 50 to 350 m²/g, and still more preferably 100 to 200 m²/g. Further, a volume average particle diameter of the silica (B1) used in the present invention is not particularly limited, but is preferably 0.1 to 50 μm, more preferably 0.3 to 40 μm, and still more preferably 0.5 to 30 μm.

The clay (B2) used in the present invention may be any compound containing silicate as a main component, and is not particularly limited, but is preferably ones containing a compound represented by the following general formula (1) as a main component. Further, as the clay (B2), it is preferable that the surface thereof is subjected to surface treatment with a surface treating agent.

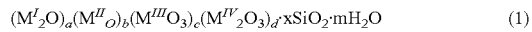

$(M^I_2O)_a(M^{II}O)_b(M^{III}_2O_3)_c(M^{IV}_2O_3)_d \cdot xSiO_2 \cdot mH_2O$ (1)

(In the above general formula (1), $M^I$ is alkaline metal, $M^{II}$ is alkaline earth metal, $M^{III}$ is an element of group 4 in the periodic table, $M^{IV}$ is an element of group 13 in the periodic table, a+b+c+d=1, x is a positive real number of 8 or less, m is 0 or a positive real number of 12 or less.)

It is preferable that the clay (B2) contains a compound represented by the above general formula (1) as a main component (e.g., one containing the compound represented by the above general formula (1) in a ratio of 90 wt % or more, preferably 95 wt % or more, more preferably 99 wt % or more). The clay (B2) may include ones containing a metallic element other than the alkali metal, the alkaline earth metal, the element of group 4 in the periodic table, and the element of group 13 in the periodic table in an amount of impurities (i.e., one containing the other metallic element in about 100 ppm by weight with respect to the total amount of the alkaline metal, the alkaline earth metal, the element of group 4 in the periodic table, and the element of group 13 in the periodic table).

In the above general formula (1), examples of the alkaline metal constituting $M^I$ include lithium, sodium, potassium, and the like. In the above general formula (1), examples of the alkaline earth metal constituting $M^{II}$ include magnesium, calcium, strontium, barium, and the like. Among them, magnesium is preferred. In the above general formula (1), examples of the element of group 4 in the periodic table constituting min include titanium and zirconium. Among them, titanium is preferred. In addition, in the above general formula (1), examples of the element of group 13 in the periodic table constituting $M^{IV}$ include boron, aluminum, and the like. Among them, aluminum is preferred.

Specific examples of the compound represented by the above general formula (1) include magnesium silicate, magnesium silicate hydrate, calcium silicate, calcium silicate hydrate, boron silicate, boron silicate hydrate, aluminum silicate, aluminum silicate hydrate, and the like. Among these, magnesium silicate and aluminum silicate are more preferred, and aluminum silicate is particularly preferred.

Further, it is preferable that the clay (B2) is one obtained by surface-treating its surface with a surface treating agent. By making the clay (B2) surface-treated with a surface treating agent, dispersibility of the clay (B2) in a cross-linkable nitrile rubber composition can be further increased, thereby further enhancing the effect of blending the clay (B2). At this time, the surface treating agent used in the surface treatment is not particularly limited, but a silane coupling agent is suitably used. Specific examples of the silane coupling agent include those mentioned above can be used exemplified as those used for the surface treatment of silica (B1), and one or more of them can be used in combination.

As a surface treating agent used for the surface treatment of clay (B2), among the silane coupling agents exemplified as those used in the surface treatment of silica (B1) mentioned above, vinyl group-containing silane coupling agents, amino group-containing silane coupling agents or epoxy group-containing silane coupling agents are preferred.

A mean volume particle size of the clay (B2) is not particularly limited, but is preferably 0.01 to 100 μm, and more preferably 0.05 to 50 μm.

The calcium carbonate (B3) used in the present invention is not particularly limited, and may be any one of heavy calcium carbonate obtained by mechanically pulverizing natural limestone and precipitated calcium carbonate produced by a chemical reaction. Further, as the calcium carbonate (B3), it is preferable to use one whose surface is surface-treated with at least one selected from fatty acids, fatty acid salts, fatty acid esters, resin acids, resin acid salts and resin acid esters, and it is more preferable to use one surface treated with fatty acid. By using the calcium carbonate (B3) whose surface is surface treated, dispersibility of the calcium carbonate (B3) in the cross-linkable nitrile rubber composition can be further increased, thereby further enhancing the effect of blending calcium carbonate (B3).

The specific surface area of the calcium carbonate (B3) used in the present invention measured by the BET method is not particularly limited, but is preferably 1 to 600 m²/g, more preferably 5 to 350 m²/g, and still more preferably 10 to 200 m²/g. Further, a mean number particle size of calcium carbonate (B3) used in the present invention is not particularly limited, but is preferably 0.1 to 500 nm, more preferably 0.3 to 400 nm, and still more preferably 0.5 to 300 nm.

<Content of Silica (B1), Clay (B2), and Calcium Carbonate (B3)>

In a cross-linkable nitrile rubber composition of the present invention, the total content of silica (B1), clay (B2), and calcium carbonate (B3) is from 150 to 200 parts by weight with respect to 100 parts by weight of the nitrile group-containing copolymer rubber (A), the content ratio of silica (B1) is more than 0 wt % and less than or equal to 50 wt % with respect to the total amount of silica (B1), clay (B2), and calcium carbonate (B3), and the content ratio of clay (B2) and calcium carbonate (B3) is in the range of 30:70 to 90:10 in a weight ratio of "clay (B2):calcium carbonate (B3)".

According to the present invention, by silica (B1), clay (B2), and calcium carbonate (B3) being included in the cross-linkable nitrile rubber composition and by setting contents thereof to the above range, the cross-linkable nitrile rubber composition that has excellent processability and can provide a cross-linked rubber having good normal physical properties and excellent in compression set resistance, resistance to swelling in oil (small change of volume in oil), and resistance to hardening in oil (small change of hardness in oil) can be obtained.

The total content of silica (B1), clay (B2), and calcium carbonate (B3) in the cross-linkable nitrile rubber composition of the present invention is from 150 to 200 parts by weight, preferably from 155 to 195 parts by weight, more preferably from 160 to 190 parts by weight, and still more preferably from 165 to 185 parts by weight, with respect to 100 parts by weight of the nitrile group-containing copolymer rubber (A). When the total content of silica (B1), clay (B2), and calcium carbonate (B3) is too small, resistance to swelling in oil of the obtained cross-linked rubber decreases, whereas when it is too large, processability of the cross-linkable nitrile rubber composition decreases.

In addition, in the cross-linkable rubber composition of the present invention, the content ratio of silica (B1) with respect to the total amount of silica (B1), clay (B2), and calcium carbonate (B3) is greater than 0 wt % and less than or equal to 50 wt %, preferably from 5 to 45 wt %, more preferably from 8 to 40 wt %, still more preferably from 10 to 35 wt %, and particularly preferably from 12 to 31 wt %. When the content ratio of silica (B1) with respect to the total amount of silica (B1), clay (B2), and calcium carbonate (B3), or the weight ratio (wt %) of the content of silica (B1) with respect to the total amount of silica (B1), clay (B2), and calcium carbonate (B3) is too small, the obtained cross-linked rubber becomes inferior in mechanical strength, whereas when it is too large, the processability of the cross-linkable nitrile rubber composition decreases and the hardness of the obtained cross-linked rubber becomes too high.

Further, in the cross-linkable rubber composition of the present invention, a content ratio of clay (B2) and calcium carbonate (B3) is 30:70 to 90:10, preferably 35:65 to 90:10, more preferably 40:60 to 85:15, and still more preferably 45:55 to 80:20, in a weight ratio of "clay (B2):calcium carbonate (B3)". When the content ratio of clay (B2) is too low with respect to calcium carbonate (B3), the obtained cross-linked rubber becomes inferior in compression set resistance, whereas when the content ratio of clay (B2) is too large with respect to calcium carbonate (B3), the obtained cross-linked rubber is inferior in mechanical strength and becomes too high in hardness.

In the present invention, contents of each of silica (B1), clay (B2), and calcium carbonate (B3) are not particularly limited and may be appropriately set so as to fall within the above range, but the content of silica (B1) is preferably from 10 to 60 parts by weight, more preferably from 15 to 55 parts by weight, and still more preferably from 20 to 50 parts by weight, with respect to 100 parts by weight of the nitrile group-containing copolymer rubber (A). Further, the content of the clay (B2) is preferably from 30 to 130 parts by weight, more preferably from 40 to 120 parts by weight, and still more preferably from 50 to 110 parts by weight, with respect to 100 parts by weight of the nitrile group-containing copolymer rubber (A), and the content of the calcium carbonate (B3) is preferably from 10 to 70 parts by weight, more preferably from 15 to 65 parts by weight, and still more preferably from 20 to 60 parts by weight, with respect to 100 parts by weight of the nitrile group-containing copolymer rubber (A).

<Polyamine-Based Cross-Linking Agent (C)>

The polyamine-based cross-linking agent (C) is not particularly limited so long as the polyamine-based cross-linking agent is a compound having two or more amino groups or a compound becoming a form having two or more amino groups at the time of cross-linking, but however, the polyamine-based cross-linking agent is preferably a compound comprised of an aliphatic hydrocarbon or an aromatic hydrocarbon in which a plurality of hydrogen atoms are substituted with amino groups or hydrazide structures (structures each represented by —$CONHNH_2$, where CO represents a carbonyl group) and a compound becoming the form of the aforementioned compound at the time of cross-linking.

Specific examples of the polyamine-based cross-linking agent (C) include aliphatic polyvalent amines such as hexamethylenediamine, hexamethylenediamine carbamate, N,N-dicinnamylidene-1,6-hexanediamine, tetramethylenepentamine, and hexamethylenediamine cinnamaldehyde adduct; aromatic polyvalent amines such as 4,4-methylenedianiline, m-phenylenediamine, 4,4-diaminodiphenyl ether, 3,4-diaminodiphenyl ether, 4,4-(m-phenylenediisopropylidene)dianiline, 4,4-(p-phenylenediisopropylidene)dianiline, 2,2-bis[4-(4-aminophenoxy)phenyl]propane, 4,4-diaminobenzanilide, 4,4-bis(4-aminophenoxy)biphenyl, m-xylylenediamine, p-xylylenediamine, and 1,3,5-benzenetriamine; and polyvalent hydrazides such as isophthalic acid dihydrazide, terephthalic acid dihydrazide, phthalic acid dihydrazide, 2,6-naphthalene dicarboxylic acid dihydrazide, naphthalenic acid dihydrazide, oxalic acid dihydrazide, malonic acid dihydrazide, succinic acid dihydrazide, glutamic acid dihydrazide, adipic acid dihydrazide, pimelic acid dihydrazide, suberic acid dihydrazide, azelaic acid dihydrazide, sebacic acid dihydrazide, brassylic acid dihydrazide, dodecanedioic acid dihydrazide, acetone dicarboxylic acid dihydrazide, fumaric acid dihydrazide, maleic acid dihydrazide, itaconic acid dihydrazide, trimellitic acid dihydrazide, 1,3,5-benzene tricarboxylic acid dihydrazide, aconitic acid dihydrazide, and pyromellitic acid dihydrazide; and the like. Among these, from the viewpoint of being capable of making the effects of the present invention more remarkable, aliphatic polyvalent amines and the aromatic polyvalent amines are preferable, hexamethylenediamine carbamate and 2,2-bis[4-(4-aminophenoxy)phenyl]propane are more preferable, and hexamethylenediamine carbamate is particularly preferable.

The content of the polyamine-based cross-linking agent (C) in the cross-linkable nitrile rubber composition of the present invention is not particularly limited, but is preferably 0.1 to 20 parts by weight, more preferably 0.2 to 15 parts by weight, and still more preferably 0.5 to 10 parts by weight, with respect to 100 parts by weight of the nitrile group-containing copolymer rubber (A). By setting the content of the polyamine-based cross-linking agent (C) within the above-mentioned range, it is possible to make the mechanical properties of the obtained cross-linked rubber better.

<Plasticizer (D)>

It is preferable that the cross-linkable nitrile rubber composition of the present invention contains a plasticizer (D) in addition to the nitrile group-containing copolymer rubber (A), silica (B1), clay (B2), calcium carbonate (B3), and polyamine-based cross-linking agent (C). By further blending the plasticizer (D), processability of the cross-linkable nitrile rubber composition and resistance to hardening in oil can be further improved.

The plasticizer (D) is not particularly limited, but trimellitic acid-based plasticizers, pyromellitic acid-based plasticizers, ether ester-based plasticizers, polyester-based plasticizers, phthalic acid-based plasticizers, adipic acid ester-based plasticizers, phosphate ester-based plasticizers, sebacic acid ester-based plasticizers, alkyl sulfonic acid ester compound plasticizers, epoxidized vegetable oil-based plasticizers, and the like can be used. Specific examples of the plasticizer (D) include tri-2-ethylhexyl trimellitate, trimellitic acid isononyl ester, trimellitic acid mixed linear alkyl esters, dipentaerythritol ester, pyromellitic acid 2-ethylhexyl ester, polyether ester (molecular weight of about 300 to 5000), bis[2-(2-butoxyethoxy)ethyl] adipate, dioctyl adipate, adipic acid-based polyester (molecular weight about 300 to 5000), dioctyl phthalate, diisononyl phthalate, dibutyl phthalate, tricresyl phosphate, dibutyl sebacate, alkyl sulfonic acid phenyl esters, epoxidized soybean oil, diheptanoate, di-2-ethylhexanoate, didecanoate, and the like. These may be used as single types or a plurality of types in combination. Among these, ether ester-based plasticizers and trimellitic acid-based plasticizers are preferred, and tri-2-ethylhexyl trimellitate is more preferred.

The content of plasticizer (D) in the cross-linkable nitrile rubber composition of the present invention is not particularly limited, but is preferably 21 parts by weight or more, more preferably 25 parts by weight or more, still more preferably 30 parts by weight or more, with respect to 100 parts by weight of the nitrile group-containing copolymer rubber (A). The upper limit of the content of plasticizer (D) is preferably 50 parts by weight or less, more preferably 45 parts by weight or less, and still more preferably 40 parts by weight or less, with respect to 100 parts by weight of nitrile group-containing copolymer rubber (A). By setting the content of plasticizer (D) within the above range, it is possible to more appropriately enhance the processability of the cross-linkable nitrile rubber composition and resistance to hardening in oil.

<Basic Cross-Linking Accelerator (E)>

It is preferable that a cross-linkable rubber composition of the present invention further comprises a basic cross-linking accelerator (E).

Specific examples of the basic cross-linking accelerator (E) include a compound represented by the following general formula (2), a basic cross-linking accelerator having a cyclic amidine structure, a guanidine-based basic cross-linking accelerator, an aldehyde amine-based basic cross-linking accelerator, and the like.

$$R^1\text{---}NH\text{---}R^2 \qquad (2)$$

(In the general formula (2), $R^1$ and $R^2$ are each independently a substituted or unsubstituted alkyl group having 1 to 12 carbon atoms, or a substituted or unsubstituted cycloalkyl group having 5 to 12 carbon atoms.)

$R^1$ and $R^2$ are each a substituted or unsubstituted alkyl group having 1 to 12 carbon atoms, or a substituted or unsubstituted cycloalkyl group having 5 to 12 carbon atoms, but are each preferably a substituted or unsubstituted cycloalkyl group having 5 to 12 carbon atoms, and particularly preferably a substituted or unsubstituted cycloalkyl group having 5 to 8 carbon atoms.

Further, $R^1$ and $R^2$ each preferably have no substituent.

Note that, in the case where $R^1$ and $R^2$ each have a substituent(s), specific examples of the substituent(s) include a hydroxyl group, an alkoxy group, an alkoxycarbonyl group, an amino group, a halogen atom, and the like.

Further, among the compounds represented by the above general formula (2), from the viewpoint of being capable of more enhancing the processability and scorch stability, a compound represented by the following general formula (3) is more preferable.

$$R^3\text{---}NH\text{---}R^4 \qquad (3)$$

(In the general formula (3), $R^3$ and $R^4$ are each independently a substituted or unsubstituted cycloalkyl group having 5 to 8 carbon atoms.)

$R^3$ and $R^4$ are each a substituted or unsubstituted cycloalkyl group having 5 to 8 carbon atoms, but are each preferably a substituted or unsubstituted cycloalkyl group having 5 to 6 carbon atoms, and more preferably a substituted or unsubstituted cycloalkyl group having 6 carbon atoms.

Further, $R^3$ and $R^4$ each preferably have no substituent.

Note that, in the case where $R^3$ and $R^4$ each have a substituent(s), specific examples of the substituent(s) include a hydroxyl group, an alkoxy group, an alkoxycarbonyl group, an amino group, a halogen atom, and the like.

Specific examples of the compound represented by the general formula (2) include dicycloalkylamines such as dicyclopentylamine, dicyclohexylamine, and dicycloheptylamine; secondary amines each having an alkyl group and a cycloalkyl group bonded to the nitrogen atom such as N-methylcyclopentylamine, N-butylcyclopentylamine, N-heptylcyclopentylamine, N-octylcyclopentylamine, N-ethylcyclohexylamine, N-butylcyclohexylamine, N-heptylcyclohexylamine, and N-octylcyclooctylamine; secondary amines each having a hydroxyl group-containing alkyl group and a cycloalkyl group bonded to the nitrogen atom such as N-hydroxymethylcyclopentylamine and N-hydroxybutylcyclohexylamine; secondary amines each having an alkoxy group-containing alkyl group and a cycloalkyl group bonded to the nitrogen atom such as N-methoxyethylcyclopentylamine and N-ethoxybutylcyclohexylamine; secondary amines each having an alkoxycarbonyl group-containing alkyl group and a cycloalkyl group bonded to the nitrogen atom such as N-methoxycarbonylbutylcyclopentylamine and N-methoxycarbonylheptylcyclohexylamine; secondary amines each having an amino group-containing alkyl group and a cycloalkyl group bonded to the nitrogen atom such as N-aminopropylcyclopentylamine and N-aminoheptylcyclohexylamine; and secondary amines each having a halogen atom-containing cycloalkyl group bonded to the nitrogen atom such as di(2-chlorocyclopentyl)amine and di(3-chlorocyclopentyl)amine; and the like. From the viewpoint of being capable of more enhancing the processability and the scorch stability, however, a dicycloalkylamine is preferable, dicyclopentylamine and dicyclohexylamine are more preferable, and dicyclohexylamine are particularly preferable.

The basic cross-linking accelerator having a cyclic amidine structure include 1,8-diazabicyclo[5.4.0]undecene-7 (hereinafter, sometimes abbreviated as "DBU"), 1,5-diazabicyclo[4.3.0]nonene-5 (hereinafter, sometimes abbreviated as "DBN"), 1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl)imidazole, 1-methylbenzimidazole, 1-methyl-2-benzylbenzimidazole, 1-methyl-5-nitrobenzimidazole, 1-methylimidazoline, 1,2-dimethylimidazoline, 1,2,4-trimethylimidazoline, 1,4-dimethyl-2-ethylimidazoline, 1-methyl-phenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline, 1-ethoxymethyl-2-methylimidazoline, and the like. Among these basic cross-linking accelerators each having a cyclic amidine structure, 1,8-diazabicyclo[5.4.0]undecene-7 and 1,5-diazabicyclo[4.3.0]nonene-5 are preferable, and 1,8-diazabicyclo[5.4.0]undecene-7 is more preferable.

The guanidine-based basic cross-linking accelerator includes tetramethylguanidine, tetraethylguanidine, diphenylguanidine, 1,3-di-o-tolylguanidine, o-tolylbiguanide, and the like.

The aldehyde amine-based basic cross-linking accelerator includes n-butylaldehyde aniline, acetaldehyde ammonia, and the like.

Among these basic cross-linking accelerators, a compound represented by the general formula (2), a guanidine-based basic cross-linking accelerator, and a basic cross-linking accelerator having a cyclic amidine structure are preferable, and a compound represented by the general formula (2) and a basic cross-linking accelerator having a cyclic amidine structure are more preferable.

Note that the compound represented by the general formula (2) may be comprised of alcohols such as an alkylene glycol and an alkyl alcohol having 5 to 20 carbon atoms mixed together, and may further contain an inorganic acid and/or an organic acid. Further, as for the compound represented by the general formula (2), the compound represented by the general formula (2) may form a salt(s) with the inorganic acid and/or the organic acid, and further may form a complex with an alkylene glycol. Further, the basic cross-linking accelerator having the above cyclic amidine structure may formula salt with a carboxylic acid or an alkyl phosphoric acid, and the like.

In the case where the basic cross-linking accelerator (E) is mixed, the amount of the basic cross-linking accelerator in the cross-linkable rubber composition of the present invention is preferably 0.1 to 20 parts by weight, more preferably 0.2 to 15 parts by weight, and still more preferably 0.5 to 10 parts by weight, with respect to 100 parts by weight of the nitrile group-containing copolymer rubber (A).

<Other Compounding Agents>

Further, other than the above, a compounding agent commonly used in the rubber field may be blended to the cross-linkable nitrile rubber composition of the present invention. Examples of the compounding agents include fillers other than silica (B1), clay (B2), and calcium carbonate (B3), co-cross-linking agents, cross-linking aids, cross-linking retarders, antiaging agents, antioxidants, light stabilizers, scorch inhibitors such as primary amines, activators such as diethylene glycol, plasticizers, processing aids such as amine-modified silicons, lubricants, adhesives, lubricating agents, flame retardants, antifungal agents, acid receiving agents, antistatic agents, pigments, foaming agents, and the like. The blending amounts of these compounding agents are not particularly limited and the compounding agents can be blended in the amounts according to the compounding purposes so long as the amounts are within ranges not impairing the object and the effects of the present invention.

The fillers other than the silica (B1), clay (B2), and calcium carbonate (B3) are not particularly limited, and examples thereof include carbon black, magnesium oxide, staple fibers, and α,β-ethylenically unsaturated carboxylic acid metallic salts such as zinc (meth)acrylate and magnesium (meth) acrylate.

Furthermore, the cross-linkable nitrile rubber composition of the present invention may contain rubber other than the nitrile group-containing copolymer rubber (A) in a range where the effects of the present invention are not obstructed. Such rubber other than the nitrile group-containing copolymer rubber (A) includes acrylic rubber, ethylene-acrylic acid copolymer rubber, fluororubber, styrene-butadiene copolymer rubber, polybutadiene rubber, ethylene-propylene copolymer rubber, ethylene-propylene-diene ternary copolymer rubber, epichlorohydrin rubber, urethane rubber, chloroprene rubber, silicone rubber, fluorosilicone rubber, chlorosulfonated polyethylene rubber, natural rubber, and polyisoprene rubber, and the like. When mixing in rubber other than the nitrile group-containing copolymer rubber (A), the amount is preferably 30 parts by weight or less, more preferably 20 parts by weight or less, still more preferably 10 parts by weight or less, with respect to 100 parts by weight of the nitrile group-containing copolymer rubber (A).

The cross-linkable nitrile rubber composition of the present invention is prepared by mixing the above ingredients preferably in a nonaqueous system. The method of preparation of the cross-linkable nitrile rubber composition of the present invention are not particularly limited, but usually it can be prepared by kneading the ingredients other than the cross-linking agent and ingredients unstable against heat (co-cross-linking agents and the like) by a mixing machine such as a Banbury mixer, internal mixer, or kneader for primary kneading, then transferring the mixture to open rolls and the like and adding the cross-linking agent and ingredients unstable against heat and the like for secondary kneading.

<Cross-Linked Rubber>

The cross-linked rubber of the present invention is obtained by cross-linking the above cross-linkable nitrile rubber composition of the present invention.

The cross-linked rubber of the present invention can be produced as follows: the cross-linkable nitrile rubber composition of the present invention is used, the composition is famed by using a forming machine corresponding to the desired shape, such as an extruder, an injection molding machine, a compressor, or a roll, the cross-linking reaction is performed by heating the famed product, and thus the shape of the famed product is fixed to produce the cross-linked rubber. In this case, the cross-linking may be performed after preliminarily performing the forming, or alternatively, the forming and the cross-linking may also be performed simultaneously. The forming temperature is usually 10 to 200° C., and preferably 25 to 120° C. The cross-linking temperature is usually 100 to 200° C. and preferably 130 to 190° C., and the cross-linking time is usually 1 minute to 24 hours and preferably 2 minutes to 1 hour.

Further, depending on the shape, size, and the like of the cross-linked product, sometimes, even if the surface is cross-linked, the inside part is not sufficiently cross-linked, so it is possible to further heat the rubber for secondary cross-linking.

As the heating method, a general method which is used for cross-linking rubber such as press heating, steam heating, oven heating, and hot air heating may be suitably selected.

The cross-linked rubber of the present invention obtained by using the cross-linkable nitrile rubber composition of the present invention mentioned above has good normal physical properties, and is excellent in compression set resistance, resistance to swelling in oil (small volume change in oil), and resistance to hardening in oil (small hardness change in oil). In particular, according to the present invention, for resistance to hardening in oil, an occurrence of hardening in oil is effectively prevented even in an oil containing a condensed polycyclic aromatic compound, in which the hardening in oil tends to occur relatively often.

Therefore, the cross-linked rubber of the present invention, taking advantage of such a characteristic, can be used for various seal members such as O-rings, packings, diaphragms, oil seals, shaft seals, bearing seals, well head seals, shock absorber seals, air compressor seals, seals for sealing in Freon or fluorohydrocarbons or carbon dioxide which is used for compressors for cooling devices for air-conditioners or refrigerating machines of air-conditioning systems, seals for sealing in supercritical carbon dioxide or subcritical carbon dioxide which is used for the washing media in precision washing, seals for roller devices (roller bearings, automotive hub units, automotive water pumps, linear guide devices and ball screws, and the like), valves and valve seats, BOP (blow out preventer), and bladders; various types of gaskets such as intake manifold gaskets which are attached at connecting parts of intake manifolds and cylinder heads, cylinder head gaskets which are attached at connecting parts of cylinder blocks and cylinder heads, rocker cover gaskets which are attached at connecting parts of rocker covers and cylinder heads, oil pan gaskets which are attached at connecting parts of oil pans and cylinder blocks or transmission cases, fuel cell separator gaskets which are attached between pairs of housings straddling unit cells provided with positive electrodes, electrolyte plates, and negative electrodes, and top cover gaskets for hard disk drives; various types of rolls such as printing rolls, iron-making rolls, papermaking rolls, industrial rolls, and office equipment rolls; various types of belts such as flat belts (film core flat belts, cord flat belts, laminated flat belts, single type flat belts, and the like), V-belts (wrapped V-belts, low edge V-belts, and the like), V-ribbed belts (single V-ribbed belts, double V-ribbed belts, wrapped V-ribbed belt, rubber-backed V-ribbed belts, top cog V-ribbed belts, and the like), CVT use belts, timing belts, toothed belts, and conveyor belts; various types of hoses such as fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, and flow lines; and various types of boots such as CVJ boots, propeller shaft boots, constant velocity joint boots, and rack and pinion boots; attenuating member rubber parts such as cushion materials, dynamic dampers, rubber couplings, air springs, shock absorbers, and clutch facing materials; dust covers, automotive interior members, friction materials, tires, covered cables, shoe soles, electromagnetic wave shields, binders for flexible printed circuit boards or other binders, fuel cell separators and also other broad applications in the electronics field. In particular, since the cross-linked rubber of the present invention is excellent in resistance to swelling in oil and resistance to hardening in oil (in particular, resistance to hardening in oil containing a condensed polycyclic aromatic compound), it can be suitably used for applications in which the cross-linked rubber is used in contact with an oil, in particular, applications in which the cross-linked rubber is used in contact with a fuel oil particularly containing a condensed polycyclic aromatic compound.

EXAMPLES

Hereinafter, the present invention will be described more specifically by way of Examples and Comparative Examples, but the present invention is not limited to these Examples. In what follows, unless otherwise specified, "parts" are parts by weight. The methods of testing or evaluating the physical properties and the characteristics are as follows.

<Rubber Composition>

The contents of the respective monomer units constituting a nitrile group-containing copolymer rubber were measured by the following method.

Specifically, the content of the mono-n-butyl maleate unit was calculated as follows. To 0.2 g of a 2-mm square piece of the nitrile group-containing copolymer rubber, 100 mL of 2-butanone was added. The mixture was stirred for 16 hours, and then 20 mL of ethanol and 10 mL of water were added to the mixture. While stirring, a titration was performed at room temperature by using a 0.02 N hydrous ethanol solution of potassium hydroxide, and thymolphthalein as an indicator, and thus the number of moles of the carboxyl group with respect to 100 g of the nitrile group-containing copolymer rubber was determined. Then, the determined number of moles was converted into the content of the mono-n-butyl maleate unit.

The content of the 1,3-butadiene unit and the content of the saturated butadiene unit were calculated by measuring the iodine values before and after hydrogenation reaction (in accordance with JIS K 6235) using the nitrile group-containing copolymer rubber.

The content of the acrylonitrile unit was calculated by measuring the nitrogen content in the nitrile group-containing copolymer rubber by the Kjeldahl method in accordance with JIS K6451-2.

The content of the n-butyl acrylate unit was determined by calculation from the content of the mono-n-butyl maleate unit, the content of the 1,3-butadiene unit, the content of the saturated butadiene unit, and the content of the acrylonitrile unit each determined as described above.

<Iodine Value>

An iodine value of nitrile group-containing copolymer rubber was measured according to JIS K 6235.

<Mooney Viscosity (Polymer Mooney, Compound Mooney)>

A Mooney viscosity of nitrile group-containing copolymer rubber (polymer Mooney) and a Mooney viscosity of a cross-linkable nitrile rubber composition (compound Mooney) were measured according to JIS K6300 (unit is [ML1+4, 100° C.]). It can be judged that the lower a Mooney viscosity of the cross-linkable nitrile rubber composition is, the better processability of the cross-linkable nitrile rubber composition is.

<Normal Physical Properties (Elongation, Tensile Strength, and Hardness)>

A cross-linkable nitrile rubber composition was placed in a mold of 15 cm in length, 15 cm in width and 0.2 cm in depth, and was press-formed at 170° C. for 20 minutes while being pressurized at a press pressure of 10 MPa, and thus a sheet-shaped cross-linked rubber was obtained. Then, the obtained cross-linked rubber was transferred to a gear oven and subjected to a secondary cross-linking at 170° C. for 4 hours to obtain a sheet-shaped cross-linked rubber, and the obtained sheet-shaped cross-linked rubber was punched with a JIS No. 3 dumbbell to prepare a test piece. Then, by using the obtained test piece, the tensile strength and the elongation at break of the cross-linked rubber were measured in accordance with JIS K6251, and, further, the hardness of the cross-linked rubber was measured by using a durometer hardness tester (type A) in accordance with JIS K6253.

<Compression Set>

A cross-linkable nitrile rubber composition was primarily cross-linked with a mold by pressing at a temperature of 170° C. for 20 minutes with pressure, which was transferred to a geer oven and secondary cross-linked at 170° C. for 4 hours to obtain a cylindrical cross-linked rubber having a diameter of 29 mm and a height of 12.5 mm. Then, using the obtained cross-linked rubber, according to JIS K6262, after placing the cross-linked rubber in a state of being compressed by 25% for 168 hours under an environment of 150° C., a compression set was measured. The smaller this value is, the better the compression set resistance is.

<Test of Resistance to Swelling in Oil (Change of Volume when Immersed in Fuel Oil)>

Using a sheet-shaped cross-linked article obtained in the same manner as in the evaluation of the above normal physical properties, according to JIS K6258, a test of resistance to swelling in oil was carried out by immersing the obtained sheet-shaped cross-linked rubber in a test fuel oil (Fuel C, a mixture of isooctane:toluene=50:50 (in volume ratio)) which is adjusted to 40° C. for 72 hours.

Note that, in the test of resistance to swelling in oil, the volume of the cross-linked rubber before and after immersing into the fuel oil was measured, and a volume change ratio ΔV (unit: %) after immersing into the fuel was calculated according to "ΔV=([volume after immersing into the fuel−volume before immersing into the fuel oil]/volume before immersing into the fuel oil)×100", and the resistance to swelling in oil was evaluated by the calculated volume change ratio ΔV. The smaller the volume change ratio ΔV is, the better the resistance to swelling in oil is.

<Test of Resistance to Hardening in Oil (Change of Hardness when Immersed in Fuel Oil Containing a Polycyclic Condensed Aromatic Compound)>

A sheet-shaped cross-linked rubber was prepared in the same manner as in the test of resistance to swelling in oil. Separately from this, a phenanthrene-containing test fuel oil was prepared by dissolving 10 wt % of phenanthrene in a mixed liquid of Fuel C and ethanol. Fuel C is a mixture of isooctane:toluene=50:50 in volume ratio, and Fuel C:ethanol is 80:20 in volume ratio.

Then, according to JIS K6253, hardness of the sheet-shaped cross-linked rubber obtained above was measured with a durometer hardness tester (Type A). Next, the sheet-shaped cross-linked rubber obtained above was immersed in the phenanthrene-containing test fuel oil prepared above at 60° C. for 70 hours. Then, the cross-linked rubber was taken out from the phenanthrene-containing test fuel oil, dried at 100° C. for 4 hours, and further left standing under room temperature conditions for 24 hours. Thereafter, under the same conditions mentioned above, hardness was measured again. Then, change of hardness ΔHs was determined according to "change of hardness ΔHs=hardness after immersion in fuel oil−hardness before immersion in fuel oil". The larger the absolute value of the change of hardness ΔHs is, the larger the increase in hardness due to immersion in the phenanthrene-containing test fuel oil becomes, and it can be judged that it is inferior in resistance to hardening in oil.

Synthesis Example 1 (Production of Nitrile Group-Containing Copolymer Rubber (A-1))

In a metallic bottle, 180 parts of ion exchanged water, 25 parts of an aqueous solution of sodium dodecylbenzenesulfonate having a concentration of 10 wt %, 15 parts of acrylonitrile, 6 parts of mono-n-butyl maleate, 39 parts of n-butyl acrylate, and 0.5 part of t-dodecyl mercaptan (molecular weight adjuster) were added in the mentioned order, the gas inside the metallic bottle was replaced with nitrogen three times, and then 40 parts of 1,3-butadiene was placed in the metallic bottle. The metallic bottle was held at 5° C., 0.1 part of cumene hydroperoxide (polymerization initiator) was placed in the metallic bottle, and the polymerization reaction was performed for 16 hours while the metallic bottle was being rotated. After 0.1 parts of an aqueous solution of hydroquinone (polymerization terminator) having a concentration of 10 wt % was added to terminate the polymerization reaction, the residual monomers were removed by using a rotary evaporator at a water temperature of 60° C., to obtain a latex (solid content concentration of about 30 wt %) of a copolymer rubber.

Then, in an autoclave, the latex of the copolymer rubber obtained as described above and a palladium catalyst (a solution prepared by mixing 1 wt % palladium acetate acetone solution and an equal weight of ion exchanged water) were added in such a way that the content of palladium was 3,000 ppm by weight with respect to the dry weight of the copolymer rubber contained in the latex of the copolymer rubber, then, a hydrogenation reaction was performed at a hydrogen pressure of 3.0 MPa and a temperature of 50° C. for 7 hours to obtain a latex of a nitrile group-containing copolymer rubber (A-1).

Next, to the obtained latex, two times volume of methanol was added to coagulate the latex, and then the resulting mixture was vacuum dried at 60° C. for 12 hours to thereby obtain the nitrile group-containing copolymer rubber (A-1). With respect to the compositions of the respective monomer units, the obtained nitrile group-containing copolymer rubber (A-1) included 15 wt % of the acrylonitrile unit, 5 wt % of the mono-n-butyl maleate unit, 35 wt % of the n-butyl acrylate unit, and 45 wt % of the 1,3-butadiene unit (including the hydrogenated moieties). Further, the obtained nitrile group-containing highly rubber (A-1) had an iodine value of 8, a carboxyl group content of $2.8 \times 10^{-2}$ ephr, and a polymer Mooney viscosity [ML1+4, 100° C.] of 41.

Synthesis Example 2 (Production of Nitrile Group-Containing Copolymer Rubber (A'-2))

The blending amount of acrylonitrile was changed to 21 parts, the blending amount of mono-n-butyl maleate was changed to 6 parts, the blending amount of n-butyl acrylate was changed to 34 parts, and the blending amount of 1,3-butadiene was changed to 39 parts, respectively. Except for this, in the same manner as in Synthesis Example 1, nitrile group-containing copolymer rubber (A'-2) was obtained. The composition of each monomer unit of the obtained nitrile group-containing copolymer rubber (A'-2) was 21 wt % of acrylonitrile units, 5 wt % of mono-n-butyl maleate units, 29 wt % of n-butyl acrylate units, and 45 wt % of 1,3-butadiene units (including the hydrogenated moieties). The iodine value of the obtained nitrile group-containing copolymer rubber (A'-2) was 8, the carboxyl group content was $2.8 \times 10^2$ ephr, and the polymer Mooney viscosity [ML1+4, 100° C.] was 48.

Synthesis Example 3 (Production of Nitrile Group-Containing Copolymer Rubber (A'-3))

To the reactor, 200 parts of ion-exchanged water and 2.25 parts of fatty acid potassium soap (potassium salt of fatty acid) were added to prepare an aqueous soap solution. Then, 19 parts of acrylonitrile and 0.5 parts of t-dodecylmercaptan (a molecular weight adjuster) were charged into this aqueous soap solution in this order, and the gas inside was purged with nitrogen 3 times. Thereafter, 40 parts of 1,3-butadiene and 41 parts of n-butyl acrylate were charged. Then, the inside of the reactor was kept at 5° C., 0.1 parts of cumene hydroperoxide (a polymerization initiator) was charged, and the polymerization reaction was carried out for 16 hours while stirring. Then, 0.1 parts of an aqueous solution of hydroquinone (a polymerization terminator) having a concentration of 10% was added to stop the polymerization reaction. The residual monomer was removed with a rotary evaporator having a water temperature of 60° C., thereby obtaining a latex of nitrile rubber (solid content concentration: about 29 wt %).

Then, the latex obtained above was added to an aqueous solution of aluminium sulfate in an amount to be 3 wt % with respect to its nitrile rubber content, stirred to coagulate the latex, and filtered off while washing with water. Thereafter, it was vacuum dried at 60° C. for 12 hours to obtain a nitrile rubber. Then, the obtained nitrile rubber was dissolved in acetone so as to have a concentration of 12%, and this was put into an autoclave, and a palladium-silica catalyst was added to the nitrile rubber for 500 ppm by weight, and a hydrogenation reaction was carried out under a hydrogen pressure of 3 MPa and at a temperature of 50° C. After completion of the hydrogenation reaction, the mixture was poured into a large amount of water to coagulate, and filtration and drying were performed to obtain a nitrile group-containing copolymer rubber (A'-3). The obtained nitrile group-containing copolymer rubber (A'-3) had an iodine value of 14, a polymer Mooney viscosity [ML1+4, 100° C.] of 61, and substantially no carboxyl group. Further, the composition of the nitrile group-containing copolymer rubber (A'-3) was 18.6 wt % of acrylonitrile units, 41.5 wt % of 1,3-butadiene units (including hydrogenated moieties), and 39.9 parts of n-butyl acrylate.

Example 1

To 100 parts of the nitrile group-containing copolymer rubber (A-1) obtained in Synthesis Example 1, 25 parts of silica (product name "Nipsil ER", available from Tosoh Silica Corporation, BET specific surface area: 111 m²/g), 100 parts of surface-treated clay (product name "Burgess KE", available from Burgess Pigment Company, aluminum silicate represented by the above general formula (1) treated with a silane coupling agent, mean volume particle size: 1.5 µm), 50 parts of calcium carbonate (product name: "Hakuenka CC", available from Shiraishi Kogyo Kaisha, Ltd., calcium carbonate surface-treated with a fatty acid, BET specific surface area: 26 m²/g, mean number particle size measured by electron microscopy: 50 nm), 35 parts of tri-2-ethylhexyl trimellitate (product name: "ADK CIZER C-8", available from ADEKA Corporation, a plasticizer), 1.5 parts of 4,4'-di-(α,α-dimethylbenzyl)diphenylamine (product name "Nocrac CD", available from OUCHI SHINKO CHEMICAL INDUSTRIAL Co., Ltd., an antioxidant), 1 part of stearic acid (a cross-linking accelerating aid), and 1 part of polyoxyethylene alkyl ether phosphate ester (product name "Phosphanol RL210", available from Toho Chemical Industry Co., Ltd.) were blended and mixed for 5 minutes at 50° C. The obtained mixture was then transferred to a roll at 50° C. to add 4 parts of 1,8-diazabicyclo[5,4,0]-undecene-7 (DBU) (product name "RHENOGRAN XLA-60(GE2014)", available from Rhein Chemie Corporation, DBU60% (including moieties that has become a zinc dialkyldiphosphate), a basic cross-linking accelerator), 2.1 parts of hexamethylenediamine carbamate (product name "Diak #1", available from DuPont de Nemours, Inc., a polyamine-based cross-linking agent included in aliphatic polyvalent amines), and 4 parts of processing aid (product name "Struktol HT-750", available from Schill+Seilacher Struktol GmbH) and kneaded to obtain a cross-linkable nitrile rubber composition.

Then, with the obtained cross-linkable nitrile rubber composition, tests and evaluations of each Mooney viscosity (compound Mooney), normal physical properties (elongation, tensile strength, hardness), compression set, test of resistance to swelling in oil, and test of resistance to hardening in oil of the cross-linkable nitrile rubber composition were performed. The results are shown in Table 1.

Example 2

The blending amount of silica (Nipsil ER) was changed from 25 parts to 30 parts, and the blending amount of calcium carbonate (Hakuenka CC) was changed from 50 parts to 40 parts, respectively. Except for this, in the same manner as in Example 1, a cross-linkable nitrile rubber composition was obtained and evaluated in the same manner. The results are shown in Table 1.

Example 3

The blending amount of silica (Nipsil ER) was changed from 25 parts to 40 parts, and the blending amount of surface-treated clay (Burgess KE) was changed from 100 parts to 80 parts, respectively. Except for this, in the same manner as in Example 1, a cross-linkable nitrile rubber composition was obtained and evaluated in the same manner. The results are shown in Table 1.

Example 4

The blending amount of silica (Nipsil ER) was changed from 25 parts to 50 parts, and the blending amount of surface-treated clay (Burgess KE) was changed from 100 parts to 75 parts, respectively. Except for this, in the same manner as in Example 1, a cross-linkable nitrile rubber composition was obtained and evaluated in the same manner. The results are shown in Table 1.

Example 5

The blending amount of surface-treated clay (Burgess KE) was changed from 100 parts to 55 parts, and the blending amount of calcium carbonate (Hakuenka CC) was changed from 50 parts to 95 parts, respectively. Except for this, in the same manner as in Example 1, a cross-linkable nitrile rubber composition was obtained and evaluated in the same manner. The results are shown in Table 1.

Example 6

The blending amount of surface-treated clay (Burgess KE) was changed from 100 parts to 125 parts, and the blending amount of calcium carbonate (Hakuenka CC) was changed from 50 parts to 25 parts, respectively. Except for this, in the same manner as in Example 1, a cross-linkable nitrile rubber composition was obtained and evaluated in the same manner. The results are shown in Table 1.

Example 7

The blending amount of silica (Nipsil ER) was changed from 25 parts to 30 parts, the blending amount of surface-treated clay (Burgess KE) was changed from 100 parts to 105 parts, and the blending amount of calcium carbonate (Hakuenka CC) was changed from 50 parts to 60 parts, respectively. Except for this, in the same manner as in Example 1, a cross-linkable nitrile rubber composition was obtained and evaluated in the same manner. The results are shown in Table 1.

Example 8

The blending amount of surface-treated clay (Burgess KE) was changed from 100 parts to 90 parts, and the blending amount of calcium carbonate (Hakuenka CC) was changed from 50 parts to 40 parts, respectively. Except for this, in the same manner as in Example 1, a cross-linkable nitrile rubber composition was obtained and evaluated in the same manner. The results are shown in Table 1.

Example 9

In place of 100 parts of surface-treated clay (Burgess KE), 100 parts of untreated clay (product name "Satintone5HB", available from BASF SE, mean volume particle size: 0.8 µm) was used. Except for this, in the same manner as in Example 1, a cross-linkable nitrile rubber composition was obtained and evaluated in the same manner. The results are shown in Table 1.

Comparative Example 1

In place of 100 parts of nitrile group-containing copolymer rubber (A-1) obtained in Synthesis Example 1, 100 parts of nitrile group-containing copolymer rubber (A'-2) obtained in Synthesis Example 2 was used. Except for this, in the same manner as in Example 1, a cross-linkable nitrile rubber composition was obtained and evaluated in the same manner. The results are shown in Table 1.

Comparative Example 2

In place of 100 parts of nitrile group-containing copolymer rubber (A-1) obtained in Synthesis Example 1, 100 parts of nitrile group-containing copolymer rubber (A'-3) obtained in Synthesis Example 3 was used. Along with this, 1,8-diazabicyclo[5,4,0]-undecene-7 (DBU), hexamethylenediamine carbamate, and amine-modified silicon were not blended, and instead, 7 parts of 1,3-bis(t-butylperoxyisopropyl)benzene (product name "Vulcup40KE", 40% product, available from Hercules Incorporated, a peroxide-based cross-linking agent) was blended. Except for this, in the same manner as in Example 1, a cross-linkable nitrile rubber composition was obtained and evaluated in the same manner. The results are shown in Table 1.

Comparative Example 3

The blending amount of surface-treated clay (Burgess KE) was changed from 100 parts to 15 parts, and the blending amount of calcium carbonate (Hakuenka CC) was changed from 50 parts to 135 parts, respectively. Except for this, in the same manner as in Example 1, a cross-linkable nitrile rubber composition was obtained and evaluated in the same manner. The results are shown in Table 1.

Comparative Example 4

The blending amount of silica (Nipsil ER) was changed from 25 parts to 90 parts, the blending amount of surface-treated clay (Burgess KE) was changed from 100 parts to 40 parts, and the blending amount of calcium carbonate (Hakuenka CC) was changed from 50 parts to 40 parts, respectively. Except for this, in the same manner as in Example 1, a cross-linkable nitrile rubber composition was obtained and evaluated in the same manner. The results are shown in Table 1.

TABLE 1

| | | Example | | | | | | | | | Comparative Example | | | |
|---|---|---|---|---|---|---|---|---|---|---|---|---|---|---|
| | | 1 | 2 | 3 | 4 | 5 | 6 | 7 | 8 | 9 | 1 | 2 | 3 | 4 |
| Composition of nitrile group-containing copolymer rubber | | | | | | | | | | | | | | |
| Acrylonitrile unit | (wt %) | 15 | 15 | 15 | 15 | 15 | 15 | 15 | 15 | 15 | 21 | 18.6 | 15 | 15 |
| 1,3-butadiene unit (including saturated part) | (wt %) | 45 | 45 | 45 | 45 | 45 | 45 | 45 | 45 | 45 | 45 | 41.5 | 45 | 45 |
| n-Butyl acrylate unit | (wt %) | 35 | 35 | 35 | 35 | 35 | 35 | 35 | 35 | 35 | 29 | 39.9 | 35 | 35 |
| Mono n-butyl maleate unit | (wt %) | 5 | 5 | 5 | 5 | 5 | 5 | 5 | 5 | 5 | 5 | 0 | 5 | 5 |
| Iodine value of nitrile group-containing copolymer rubber | | 8 | 8 | 8 | 8 | 8 | 8 | 8 | 8 | 8 | 8 | 14 | 8 | 8 |
| Composition of cross-linkable nitrile rubber composition | | | | | | | | | | | | | | |
| Nitrile group-containing copolymer rubber (A-1) | (parts) | 100 | 100 | 100 | 100 | 100 | 100 | 100 | 100 | 100 | | | 100 | 100 |
| Nitrile group-containing copolymer rubber (A'-2) | (parts) | | | | | | | | | | 100 | | | |
| Nitrile group-containing copolymer rubber (A'-3) | (parts) | | | | | | | | | | | 100 | | |
| Silica | (parts) | 25 | 30 | 40 | 50 | 25 | 25 | 30 | 25 | 25 | 25 | 25 | 25 | 90 |
| Surface-treated clay | (parts) | 100 | 100 | 80 | 75 | 55 | 125 | 105 | 90 | | 100 | 100 | 15 | 40 |

TABLE 1-continued

|  |  | Example |  |  |  |  |  |  |  |  | Comparative Example |  |  |  |
|---|---|---|---|---|---|---|---|---|---|---|---|---|---|---|
|  |  | 1 | 2 | 3 | 4 | 5 | 6 | 7 | 8 | 9 | 1 | 2 | 3 | 4 |
| Untreated clay | (parts) |  |  |  |  |  |  |  |  | 100 |  |  |  |  |
| Calcium carbonate | (parts) | 50 | 40 | 50 | 50 | 95 | 25 | 60 | 40 | 50 | 50 | 50 | 135 | 40 |
| Tri-2-ethylhexyl trimellitic acid | (parts) | 35 | 35 | 35 | 35 | 35 | 35 | 35 | 35 | 35 | 35 | 35 | 35 | 35 |
| 4,4'-di-(α,α-dimethylbenzyl) diphenylamine | (parts) | 1.5 | 1.5 | 1.5 | 1.5 | 1.5 | 1.5 | 1.5 | 1.5 | 1.5 | 1.5 | 1.5 | 1.5 | 1.5 |
| Stearic acid | (parts) | 1 | 1 | 1 | 1 | 1 | 1 | 1 | 1 | 1 | 1 | 1 | 1 | 1 |
| Polyoxyethylene alkyl ether phosphoric acid ester | (parts) | 1 | 1 | 1 | 1 | 1 | 1 | 1 | 1 | 1 | 1 | 1 | 1 | 1 |
| Hexanethylenediamine carbamate | (parts) | 2.1 | 2.1 | 2.1 | 2.1 | 2.1 | 2.1 | 2.1 | 2.1 | 2.1 | 2.1 |  | 2.1 | 2.1 |
| 1,8-Diazabicyclo[5,4,0]-undecene-7 60% product | (parts) | 4 | 4 | 4 | 4 | 4 | 4 | 4 | 4 | 4 | 4 |  | 4 | 4 |
| Processing aid | (parts) | 4 | 4 | 4 | 4 | 4 | 4 | 4 | 4 | 4 | 4 |  | 4 | 4 |
| 1,3-bis(butylperoxyisopropyl) benzene | (parts) |  |  |  |  |  |  |  |  |  |  | 7 |  |  |
| Total amount of silica + clay + calcium carbonate | (parts) | 175 | 170 | 170 | 175 | 175 | 175 | 195 | 155 | 175 | 175 | 175 | 175 | 170 |
| Weight ratio of silica with respect to silica + clay + calcium carbonate | (wt %) | 14 | 18 | 24 | 29 | 14 | 14 | 15 | 16 | 14 | 14 | 14 | 14 | 53 |
| Clay: calcium carbonate (weight ratio) |  | 67:33 | 71:29 | 62:38 | 60:40 | 37:63 | 83:17 | 64:36 | 69:31 | 67:33 | 67:33 | 67:33 | 10:90 | 50:50 |
| Evaluation of cross-linkable nitrile rubber composition |  |  |  |  |  |  |  |  |  |  |  |  |  |  |
| Compound Mooney viscosity (ML1 + 4, 100° C.) |  | 51 | 54 | 64 | 72 | 45 | 53 | 57 | 48 | 61 | 57 | 58 | 39 | 104 |
| Evaluation of cross-linkable nitrile rubber composition |  |  |  |  |  |  |  |  |  |  |  |  |  |  |
| Elongation | (%) | 180 | 190 | 180 | 170 | 170 | 180 | 170 | 180 | 160 | 200 | 250 | 180 | 140 |
| Tensile strength | (Mpa) | 10.0 | 10.4 | 11.8 | 13.7 | 11 | 8.9 | 10.4 | 9.5 | 11.5 | 12.1 | 14.5 | 7.2 | 16.9 |
| Hardness |  | 71 | 72 | 74 | 71 | 69 | 73 | 74 | 70 | 71 | 71 | 72 | 71 | 81 |
| Compression set | (%) | 22.4 | 22.0 | 22.4 | 24.2 | 26.8 | 22.2 | 22.6 | 22.0 | 21.0 | 24.0 | 70.0 | 30.7 | 24.5 |
| Volume change ratio when immersed in fuel oil (test of resistance to swelling in oil) | (%) | 59 | 59 | 60 | 59 | 59 | 59 | 57 | 61 | 59 | 45 | 69 | 59 | 60 |
| Change of hardness when immersed in condensed polycyclic aromatic compound-containing fuel oil (test of resistance to hardening in oil) |  | 0 | −1 | −2 | 0 | 0 | 0 | 0 | 0 | 0 | 6 | −1 | 0 | 0 |

As shown in Table 1, a cross-linkable nitrile rubber composition obtained by adding a polyamine-based cross-linking agent (C) to nitrile group-containing copolymer rubber (A) containing an α,β-ethylenically unsaturated nitrile monomer unit, a conjugated diene monomer unit, an α,β-ethylenically unsaturated monocarboxylic acid ester monomer unit, and carboxyl group-containing monomer unit, a content ratio of the α,β-ethylenically unsaturated nitrile monomer unit being 8 to 18 wt %, and having an iodine value of 120 or less; and blending silica (B1), clay (B2), and calcium carbonate (B3) thereto in a specific ratio had a low compound Mooney and was excellent in processability. Further, a cross-linked rubber obtained using such a cross-linkable nitrile rubber composition had good normal physical properties (elongation, tensile strength, and hardness), small compression set, and excellent resistance to swelling in oil (change of volume in a fuel oil) and resistance to hardening in oil (change of hardness when immersed in a fuel oil containing a condensed polycyclic aromatic compound) (Examples 1 to 9).

On the other hand, when a nitrile group-containing copolymer rubber having a content ratio of α,β-ethylenically unsaturated nitrile monomer unit of more than 18 wt % was used, a change of hardness when immersed in a fuel oil containing a condensed polycyclic aromatic compound was large, and thus was inferior in resistance to hardening in oil (Comparative Example 1).

Further, when a nitrile group-containing copolymer rubber containing no carboxyl group-containing monomer unit was used, compression set was large, and a change of volume in fuel oil was large, and thus was inferior in resistance to swelling in oil (Comparative Example 2).

When the content ratio of clay (B2) with respect to calcium carbonate (B3) was too low, the obtained cross-linked rubber had large compression set, and thus was inferior in compression set resistance (Comparative Example 3).

In addition, when the weight ratio of a content of silica (B1) with respect to the total amount of silica (B1), clay (B2), and calcium carbonate (B3) was too large, a compound Mooney viscosity became high, and thus, processability of a cross-linkable nitrile rubber composition was inferior (Comparative Example 4).

The invention claimed is:

1. A cross-linkable nitrile rubber composition comprising:
nitrile group-containing copolymer rubber (A) containing an α, β-ethylenically unsaturated nitrile monomer unit, a conjugated diene monomer unit, an α, β-ethylenically unsaturated monocarboxylic acid ester monomer unit, and carboxyl group-containing monomer unit, a content ratio of the α, β-ethylenically unsaturated nitrile monomer unit being 8 to 18 wt %, and having an iodine value of 120 or less;
silica (B1);
clay (B2);
calcium carbonate (B3); and
a polyamine-based cross-linking agent (C),
wherein a total amount of the silica (B1), the clay (B2), and the calcium carbonate (B3) is 150 to 200 parts by weight with respect to 100 parts by weight of the nitrile group-containing copolymer rubber (A), a content ratio of the silica (B1) is greater than 0 wt % and 50 wt % or less with respect to the total amount of the silica (B1), the clay (B2), and the calcium carbonate (B3), and a content ratio of the clay (B2) and the calcium carbonate (B3) is 30:70 to 90:10 in a weight ratio of "clay (B2):calcium carbonate (B3)".

2. The cross-linkable nitrile rubber composition according to claim 1, wherein the clay (B2) comprises a compound represented by the following general formula (1) as a main component,

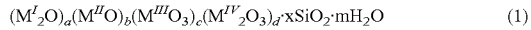
$$(M^I_2O)_a(M^{II}O)_b(M^{III}_2O_3)_c(M^{IV}_2O_3)_d \cdot xSiO_2 \cdot mH_2O \tag{1}$$

wherein, $M^I$ is an alkaline metal, $M^{II}$ is an alkaline earth metal, $M^{III}$ is an element in group 4 of the periodic table, $M^{IV}$ is an element in group 13 of the periodic table, $a+b+c+d=1$, x is a positive real number of 8 or less, and m is 0 or a positive real number of 12 or less.

3. The cross-linkable nitrile rubber composition according to claim 1, wherein the clay (B2) is surface-treated clay that is surface treated with a surface treating agent.

4. The cross-linkable nitrile rubber composition according to claim 1, further comprising a plasticizer (D), wherein a content of the plasticizer (D) is 21 to 50 parts by weight with respect to 100 parts by weight of the nitrile group-containing copolymer rubber (A).

5. The cross-linkable nitrile rubber composition according to claim 1, wherein a content of the silica (B1) is 10 to 60 parts by weight with respect to 100 parts by weight of the nitrile group-containing copolymer rubber (A).

6. The cross-linkable nitrile rubber composition according to claim 1, wherein a content of the clay (B2) is 30 to 130 parts by weight with respect to 100 parts by weight of the nitrile group-containing copolymer rubber (A).

7. The cross-linkable nitrile rubber composition according to claim 1, wherein a content of the calcium carbonate (B3) is 10 to 70 parts by weight with respect to 100 parts by weight of the nitrile group-containing copolymer rubber (A).

8. The cross-linkable nitrile rubber composition according to claim 1, wherein the silica (B1) is a coupling agent-treated silica that is surface treated with a coupling agent.

9. A cross-linked rubber obtained by cross-linking the cross-linkable nitrile rubber composition according to claim 1.

* * * * *